Nov. 4, 1941.    J. F. JOY    2,261,161
MINING APPARATUS
Filed Feb. 28, 1938    9 Sheets-Sheet 1
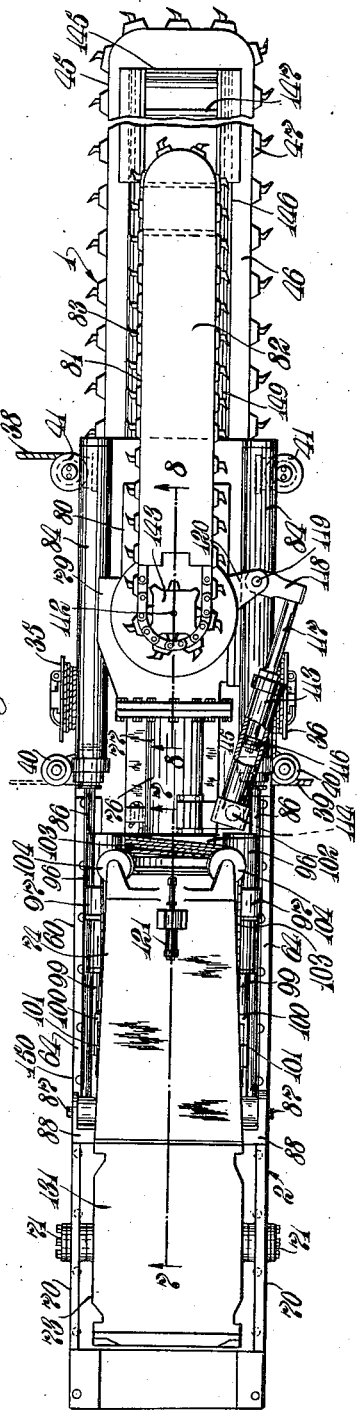
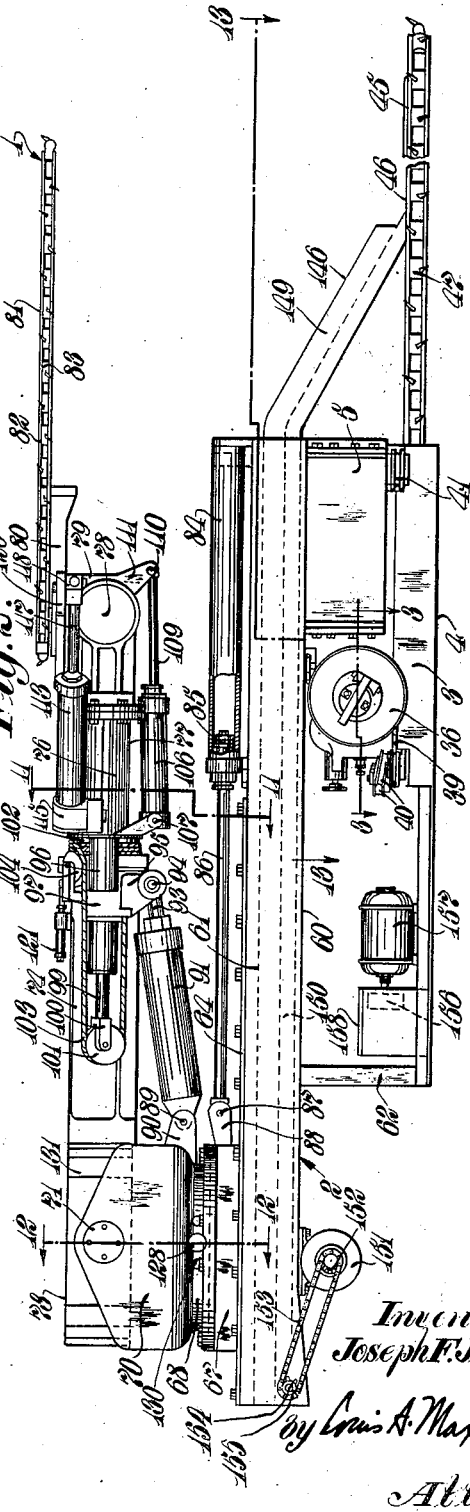
Inventor:
Joseph F. Joy.
by Louis A. Maxson.
Atty.

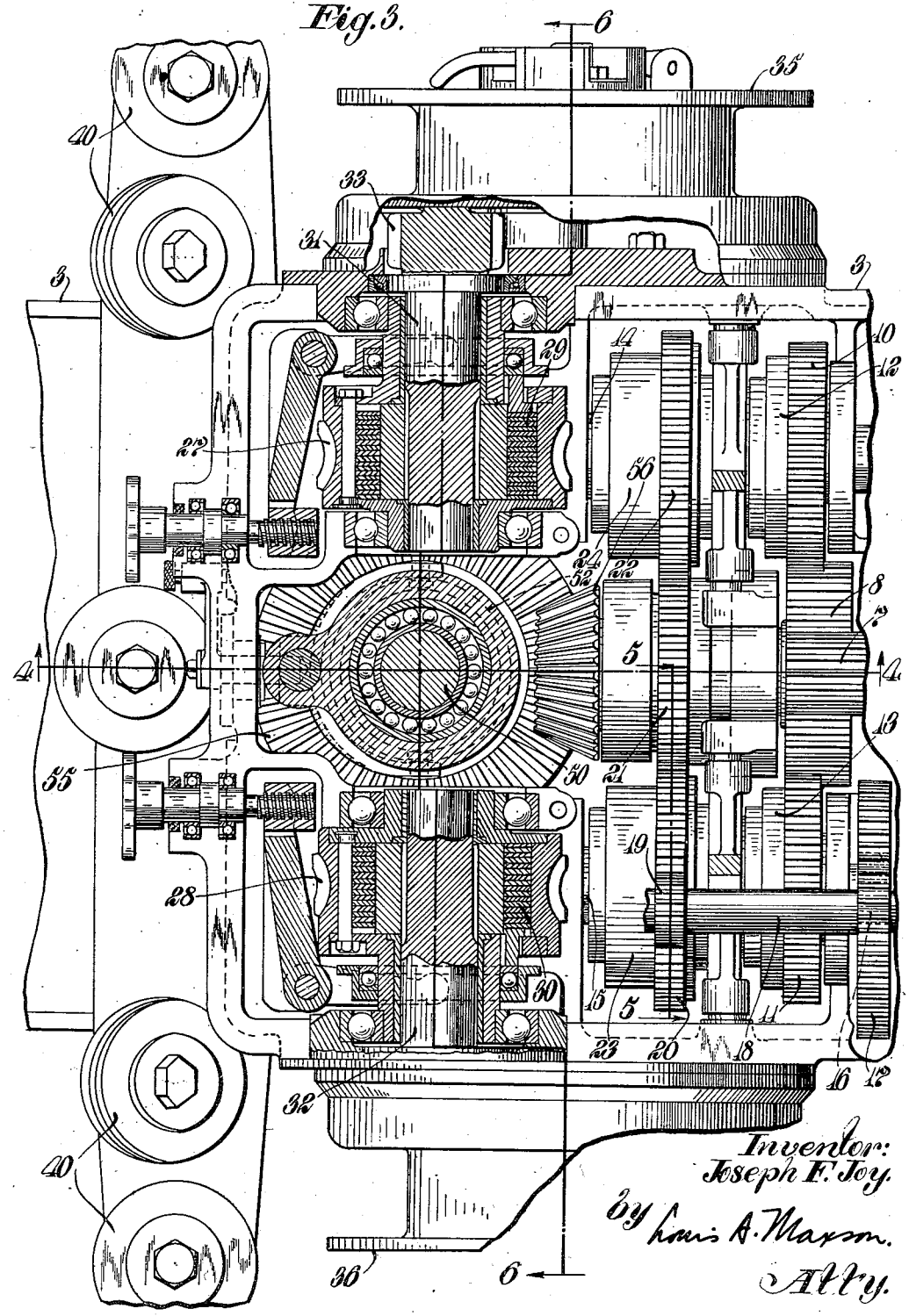

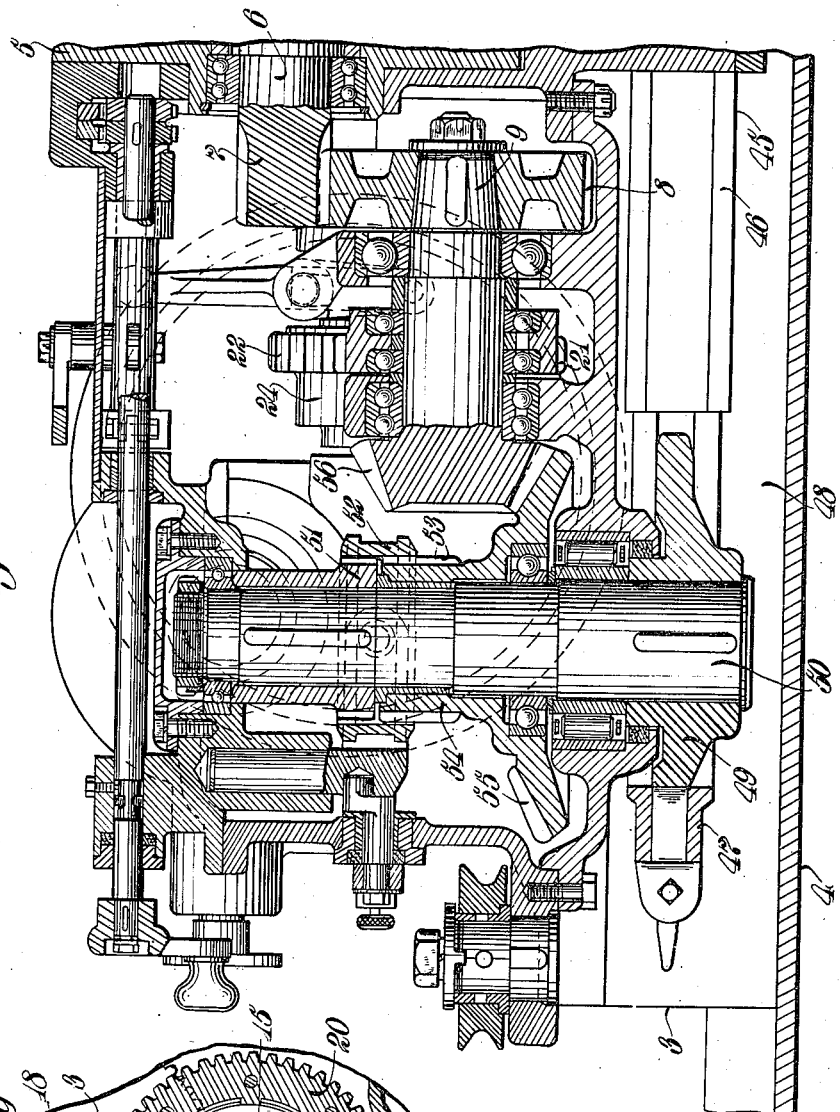

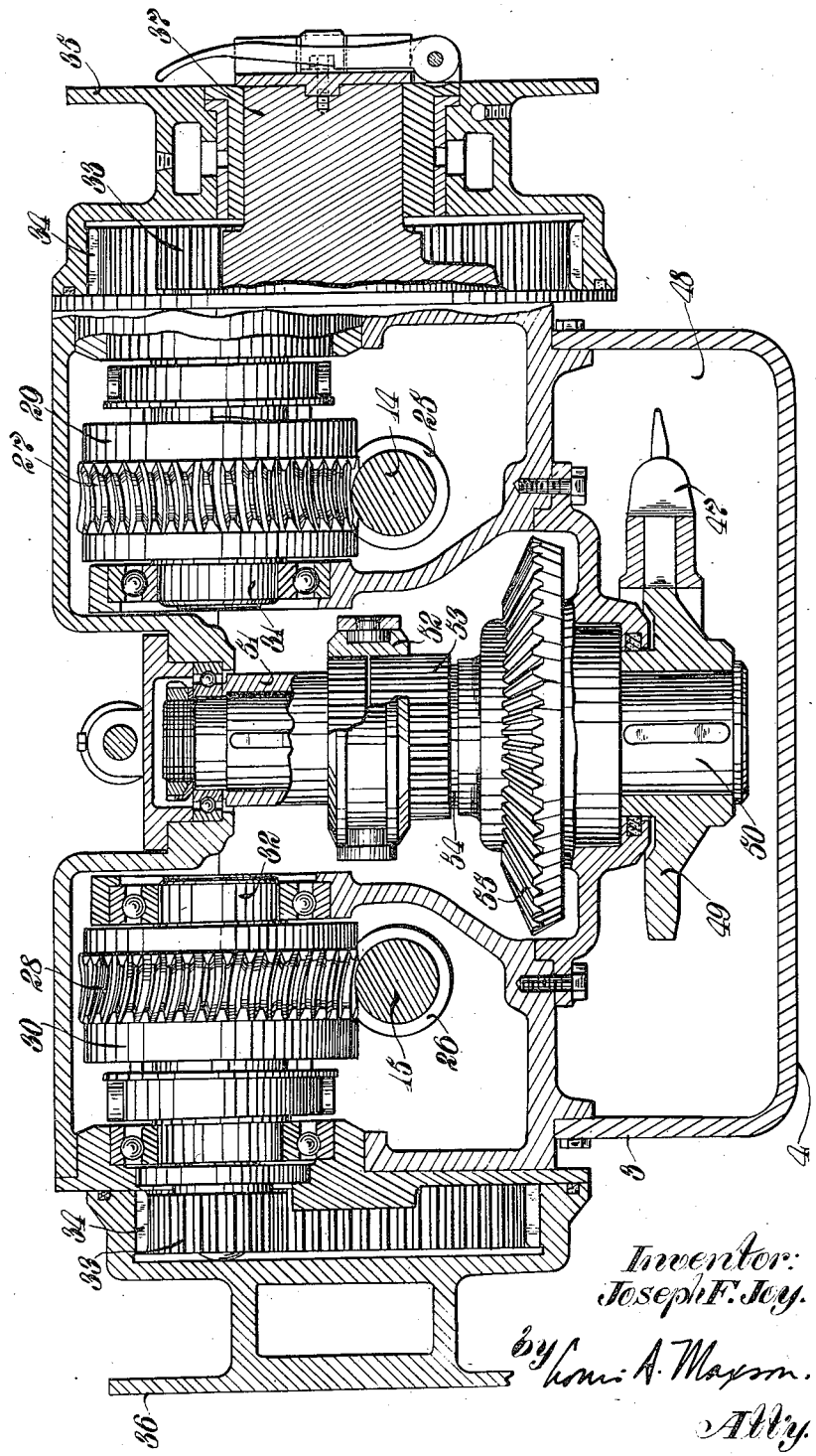

Nov. 4, 1941.   J. F. JOY   2,261,161
MINING APPARATUS
Filed Feb. 28, 1938   9 Sheets-Sheet 5
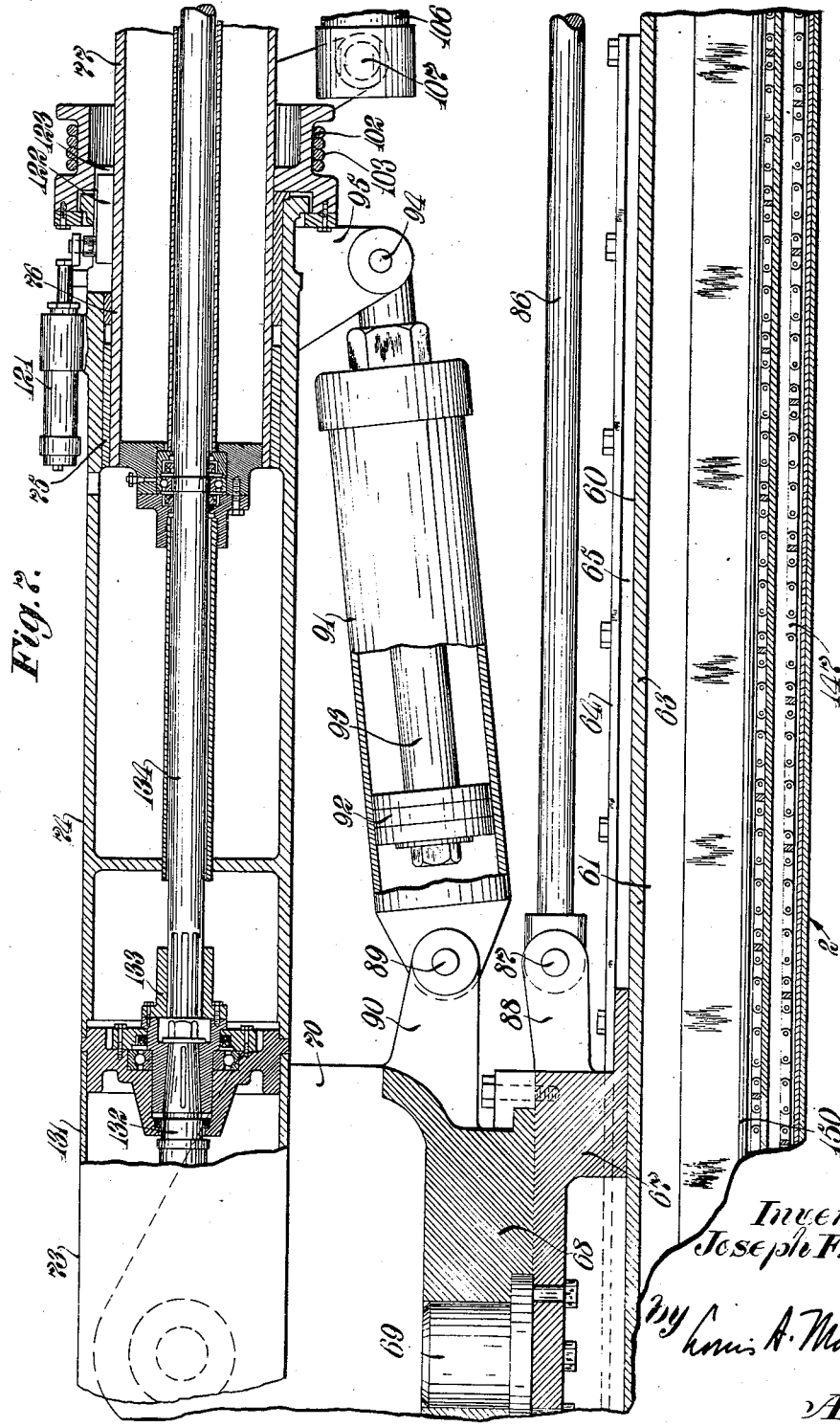
Inventor:
Joseph F. Joy.
by Louis A. Maxson
Atty.

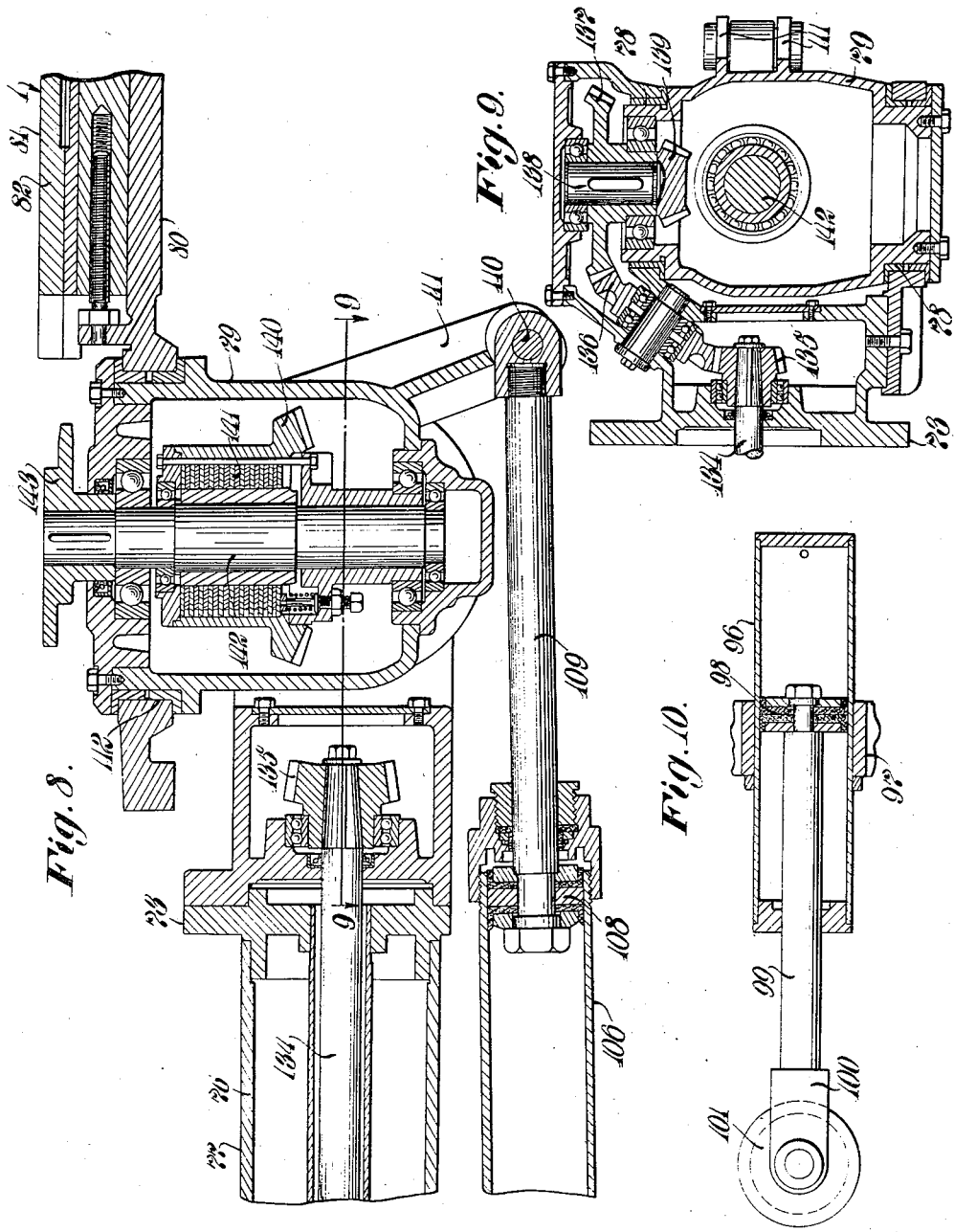

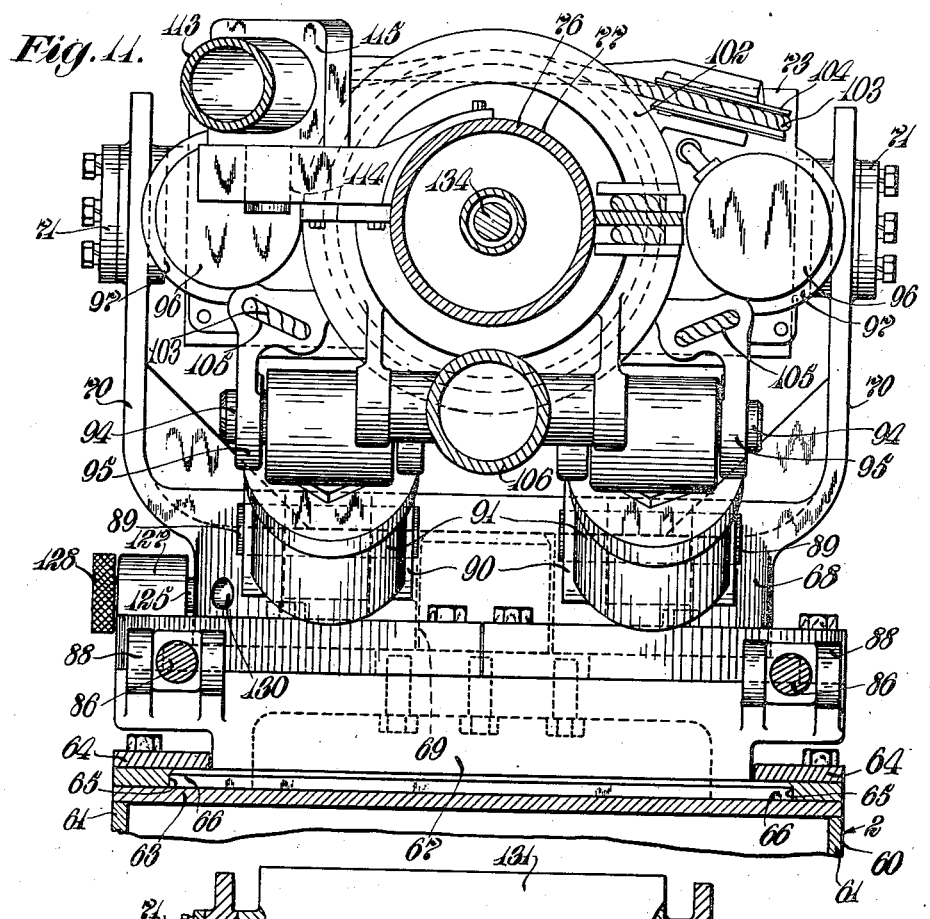
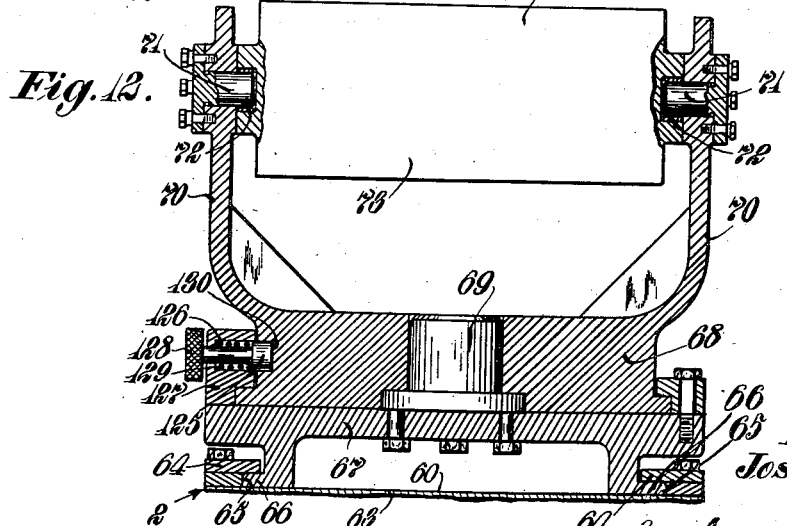

Nov. 4, 1941.  J. F. JOY  2,261,161
MINING APPARATUS
Filed Feb. 28, 1938  9 Sheets-Sheet 8
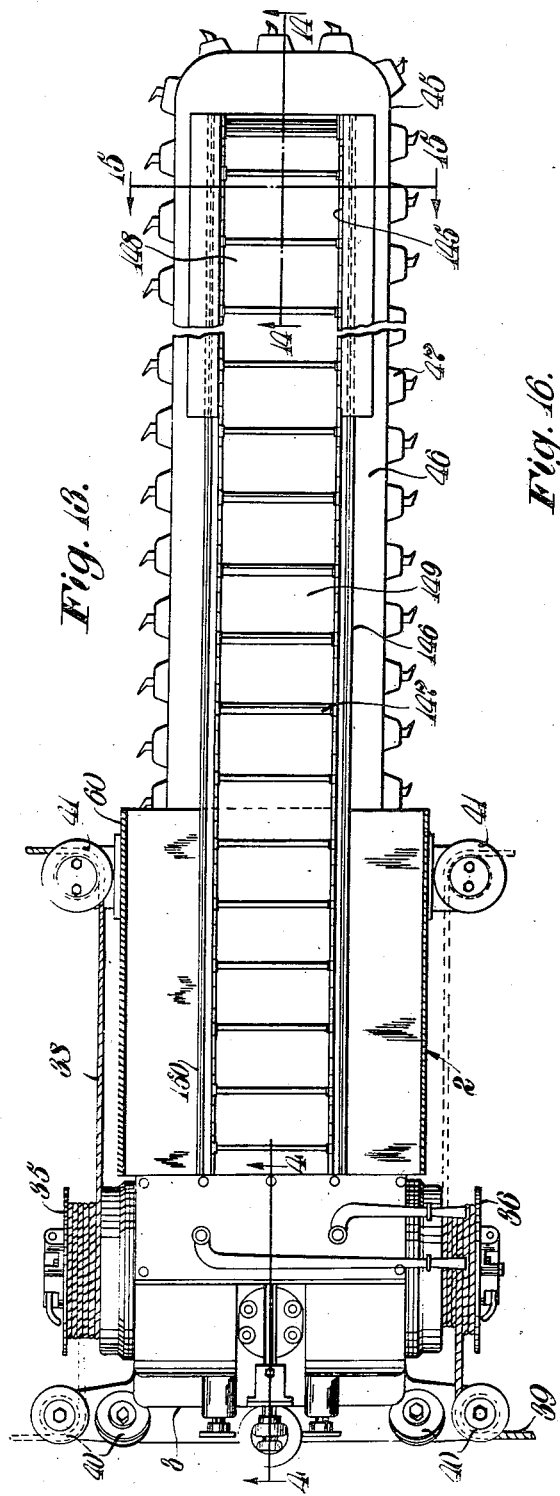
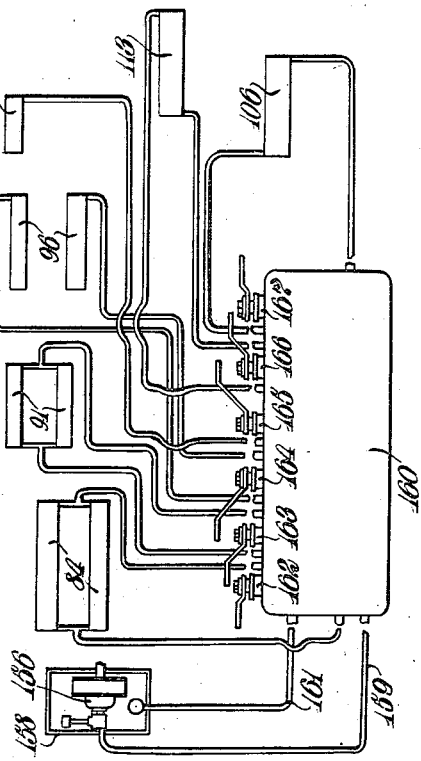
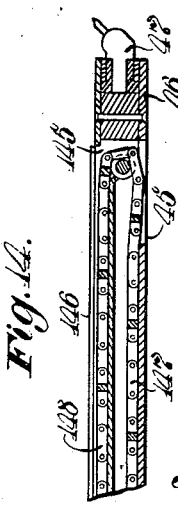
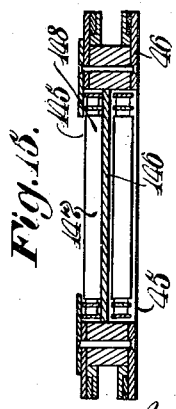
Inventor:
Joseph F. Joy.
by Louis A. Maxson.
Atty.

Nov. 4, 1941.          J. F. JOY          2,261,161
MINING APPARATUS
Filed Feb. 28, 1938          9 Sheets-Sheet 9
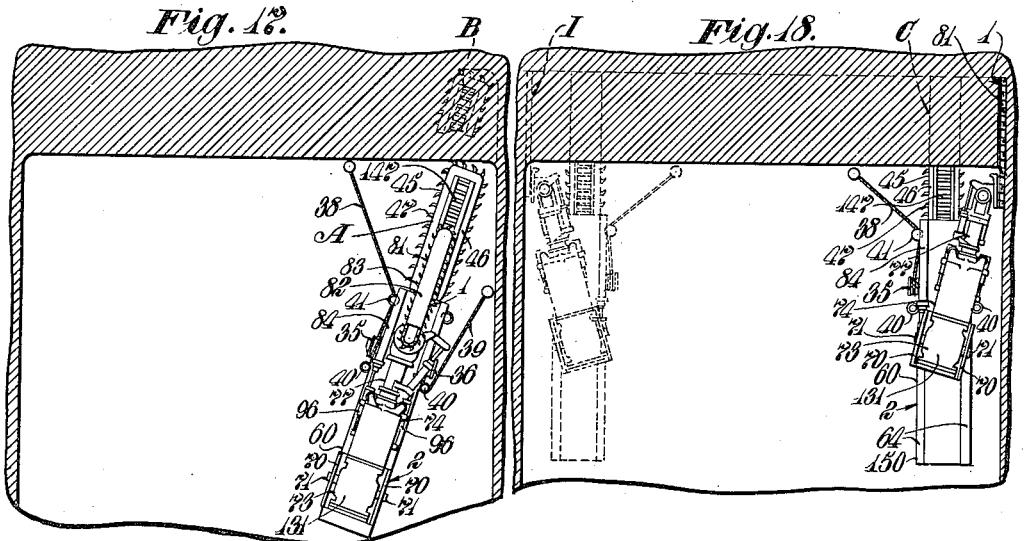
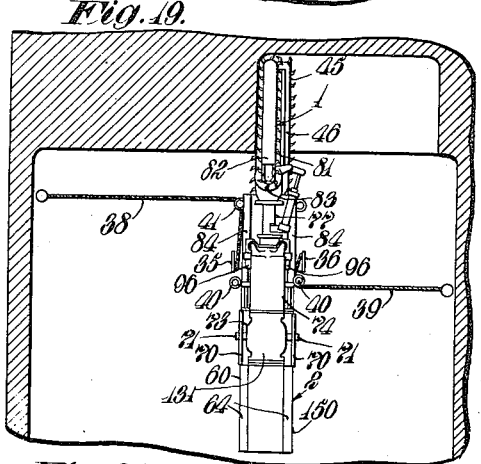
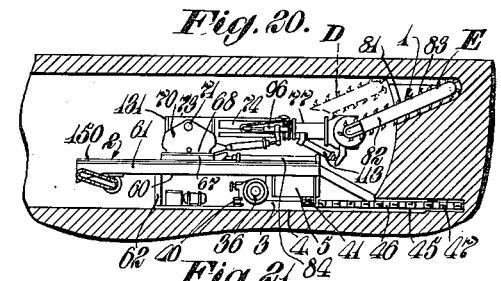
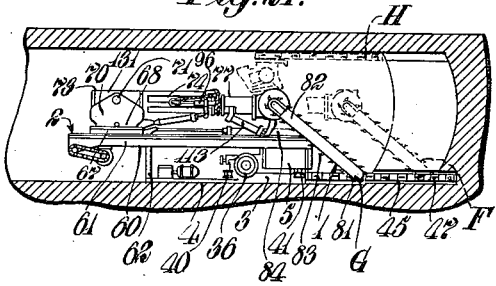
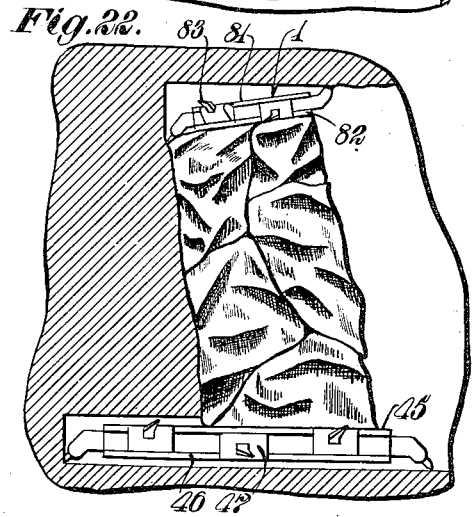
Inventor:
Joseph F. Joy.
by Louis A. Mapson
Atty.

Patented Nov. 4, 1941

2,261,161

UNITED STATES PATENT OFFICE 2,261,161

MINING APPARATUS

Joseph F. Joy, Claremont, N. H., assignor to Sullivan Machinery Company, a corporation of Massachusetts Application February 28, 1938, Serial No. 192,919

14 Claims. (Cl. 262—28)

This invention relates to mining apparatus, and more particularly to improvements in coal mining apparatus of a combined cutting and loading type for cutting the solid coal, breaking down the cut coal from the solid and loading the broken down coal.

An object of this invention is to provide an improved coal mining apparatus for completely removing the solid coal from its natural bed in a coal seam wholly without the use of explosives or other blasting means, and for loading the coal as it is removed from the coal seam. Another object is to provide an improved coal mining apparatus of the combined cutting and loading type having improved means for cutting and breaking down the coal. A further object is to provide an improved cutting and loading apparatus having improved cutting and breaking down means, and embodying means associated therewith for conveying the broken down coal away from the coal face. A still further object is to provide an improved cutting and loading apparatus having improved kerf cutting mechanism embodying superimposed horizontal kerf cutters, the top kerf cutter being adjustable into a shear cutting position with respect to the bottom kerf cutter. Another object is to provide an improved adjustable supporting structure for the top kerf cutter for adjusting the latter into horizontal and vertical cutting positions and for tilting the same to effect breaking down of the coal. Yet another object is to provide an improved cutting and loading apparatus having top and bottom horizontal kerf cutters for cutting out a core of coal in a coal seam, the top kerf cutter being adjustable relative to the bottom kerf cutter, to break down fragments of the core as cutting progresses, and having improved conveying means associated with the bottom kerf cutter for conveying the broken down coal away from the coal face. A further object is to provide an improved cutting and loading apparatus of the flexibly fed, floor type adapted to rest upon and slide over a mine floor during the cutting and loading operations. Another object is to provide an improved cutting and loading apparatus of the reversible type adapted to cut and load in either of opposite directions. Still another object is to provide an improved cutting and loading apparatus having novel arrangements and combinations of parts. These and other objects and advantages of the invention will, however, hereinafter more fully appear.

In the accompanying drawings there is shown for purposes of illustration one form which the invention may assume in practice.

In these drawings:

Fig. 1 is a top plan view of a coal mining apparatus constructed in accordance with an illustrative embodiment of the invention.

Fig. 2 is a side elevational view of the mining apparatus shown in Fig. 1, parts being shown in section to illustrate structural details.

Fig. 3 is an enlarged horizontal sectional view taken substantially on line 3—3 of Fig. 2.

Fig. 4 is a view in longitudinal vertical section taken substantially on line 4—4 of Figs. 3 and 13, parts being omitted to facilitate illustration.

Fig. 5 is a detail vertical sectional view taken on line 5—5 of Fig. 3.

Fig. 6 is a cross sectional view taken substantially on line 6—6 of Fig. 3.

Fig. 7 is an enlarged view in longitudinal vertical section taken substantially on line 7—7 of Fig. 1.

Fig. 8 is an enlarged view in longitudinal vertical section taken substantially on line 8—8 of Fig. 1.

Fig. 9 is a horizontal sectional view on a somewhat reduced scale, taken substantially on line 9—9 of Fig. 8.

Fig. 10 is a detail sectional view showing one of the rotating cylinders for the cutter head.

Fig. 11 is an enlarged cross sectional view taken substantially on line 11—11 of Fig. 2.

Fig. 12 is an enlarged cross sectional view taken substantially on line 12—12 of Fig. 2.

Fig. 13 is a horizontal sectional view taken substantially on line 13—13 of Fig. 2, with parts omitted to facilitate illustration.

Fig. 14 is an enlarged detail vertical sectional view taken on line 14—14 of Fig. 13.

Fig. 15 is an enlarged cross sectional view taken on line 15—15 of Fig. 13

Fig. 16 is a diagrammatic view of the hydraulic fluid system and the associated control means.

Fig. 17 is a diagrammatic plan view, showing the apparatus in sumping position at the right hand rib, with the top cutter in its retracted position.

Fig. 18 is a diagrammatic plan view, showing the apparatus in shearing position at the right hand rib, the shearing position of the apparatus at the left hand rib being indicated in dotted lines.

Fig. 19 is a diagrammatic plan view, showing the apparatus during the transverse cutting operation.

Figs. 20 and 21 are diagrammatic side views, showing the apparatus during the shear cutting operation.

Fig. 22 is a diagrammatic end view showing the relation of the top and bottom kerf cutters during the cutting and breaking down operations.

In this illustrative embodiment of the invention, there is shown a coal mining apparatus of the combined cutting and loading, flexibly fed, floor type mounted for sliding movement on its own bottom over a mine floor, although it will be understood that the apparatus may, if desired, be mounted on a wheeled truck for movement along a trackway, or tractor tread mounted. The cutting and loading apparatus disclosed herein has cutting and breaking down mechanism generally designated 1, for cutting the solid coal and breaking down the cut coal from the solid, and associated with the cutting and breaking down mechanism is conveying means, generally designated 2, for receiving the broken down coal and moving the latter away from the coal face toward an elevated discharge position at the rear end of the apparatus. The apparatus more specifically comprises a main base frame 3 having a smooth bottom surface 4 adapted to rest upon and slide over a mine floor, and the cutting and breaking down mechanism and the conveying means are mounted on this base frame in a manner to be later described.

The mechanism for feeding the apparatus bodily over the mine floor during maneuvering of the apparatus with respect to the coal face and during the cutting and loading operations may assume various forms, but may be similar to that disclosed in a copending application Serial No. 71,653, filed Mar. 30, 1936, now matured into Patent No. 2,131,178, granted September 27, 1938, of which I am a co-inventor. This feeding mechanism comprises a motor 5, herein preferably of the reversible electric type, arranged within the forward portion of the base frame 3 and having its power shaft 6 horizontally disposed and extending longitudinally of the base frame. As shown in Fig. 4, secured to the rear end of the motor power shaft 6, is a spur motor pinion 7 meshing with a spur gear 8 keyed to a longitudinal shaft 9 suitably journaled within the base frame. The gear 8 meshes with spur gears 10 and 11 arranged on parallel axes spaced equidistantly from the shaft 9 in parallelism with the latter at the opposite sides of the base frame. The spur gears 10 and 11 are connectible by conventional disc clutches 12 and 13, similar to those described in the application above referred to, to shafts 14 and 15 respectively, the shafts arranged coaxially with the spur gears and suitably journaled within the base frame. Rotattable with and driven by the spur gear 11 is a spur gear 16 (Fig. 3) meshing with a spur gear 17 keyed to a shaft 18 herein arranged parallel with and above the shaft 15 and likewise suitably journaled within the base frame. Fixed to the shaft 18 is a spur gear 19 (see also Fig. 5) meshing with a spur gear 20 arranged coaxially with the spur gear 11. The gear 20 meshes with a spur gear 21, the latter in turn meshing with a spur gear 22 arranged coaxially with the spur gear 10. The spur gears 10, 11 constitute the high speed terminal driving elements of the high speed transmissions, while the spur gears 20, 22 constitute the low speed driving elements of the low speed transmissions; and the gears 20 and 22 are connectible by conventional disc clutches 23 and 24, similar to the clutches 12 and 13, to the coaxial shafts 15 and 14 respectively. Fixed to the shafts 14 and 15 are worms 25 and 26 respectively, herein meshing with the bottoms of and driving in relatively opposite directions, worm wheels 27 and 28 respectively (see Fig. 6). These worm wheels are connectible by conventional disc clutches 29, 30 to coaxial shafts 31 and 32 arranged with their axes horizontally disposed and extending transversely of the base frame. Secured to each of the shafts respectively is a spur gear 33 meshing with the teeth of an internal gear 34, the latter formed on the inner flanges of a pair of cable winding or haulage drums 35 and 36. These drums are arranged in coaxial relation on alined horizontal axes extending transversely of the base frame and are journaled at the opposite sides of the latter on projecting shafts 37, and these drums respectively have wound thereupon feeding and controlling cables 38 and 39. Arranged at the opposite rear corners of the base frame are pairs of guide sheaves 40, 40, while mounted at the opposite sides of the base frame at the forward end thereof are front guide sheaves 41, and the feeding and controlling cables 38 and 39 are adapted to be extended in various directions around these guide sheaves 40, 41, to feed and guide the apparatus, in the manners well understood by those skilled in the art. As this feeding mechanism is clearly described in the copending application above referred to and does not per se enter into this invention, further description thereof is herein considered unnecessary.

Now referring to the improved cutting and breaking down mechanism generally designated 1, it will be noted that supported within the lower portion of the base frame and projecting forwardly therefrom is an elongated, horizontal kerf cutter 45 comprising a horizontal plane cutter bar 46 of generally rectangular shape having guided for circulation about its margin an endless cutter chain 47. The cutter bar is supported within the lower part of the base frame and projects rearwardly within a longitudinal chamber 48 opening rearwardly through the rear end of the base frame (see Fig. 4), and the cutter chain circulates within this chamber and is driven by a sprocket 49 keyed to the lower end of a vertical shaft 50. The shaft 50 is suitably journaled within the base frame and has keyed thereto, near its upper end, a clutch member 51 connectible by a manually controllable, sliding clutch member 52 to clutch teeth 53 formed on the hub 54 of a bevel gear 55, the latter herein journaled on bearings supported by the shaft. Meshing with and driving the bevel gear 55 is a bevel gear 56 secured to the horizontal shaft 9 above referred to, so that when the clutch 51, 52, 53 is connected, the cutter chain may be driven from the motor 5 through the spur gearing 7, 8, shaft 9, bevel gearing 56, 55, shaft 50 and the chain sprocket 49.

Mounted in superimposed relation on the base frame 3 is a horizontal frame structure 60 having its forward portion overlying the base and its rearward portion overhanging a substantial distance the rear end of the base, in the manner clearly shown in Fig. 2. This frame structure comprises horizontal side frame members 61, 61 in the form of vertical side plates secured at opposite sides of the forward portion of the base frame and mounted on upstanding supports 62 on the rear end of the base frame. Secured to and supported by these vertical side plates 61, 61 is a horizontal top plate 63, and secured to the top of the plate 63 along the opposite side portions thereof are longitudinal guide members 64, 64 providing longitudinal guideways 65, 65, in which are slidably guided lateral projections 66, 66 formed integral with a sliding frame 67. The frame 67 is slidably mounted on the frame structure 60 for movement lengthwise thereof and has mounted thereon a horizontal turntable 68, the latter journaled for rotation about a vertical axis on a bearing member 69 located centrally on the sliding frame 67, so that the turntable may swivel about a vertical axis relative to the sliding frame. The turntable 68 has upstanding side arms 70, 70 supporting trunnions 71 on which is pivotally mounted at 72 on a horizontal axis extending transversely of the turntable, an elongated arm structure 73. This arm structure is pivotally mounted on the turntable for swinging movement in a vertical direction with respect thereto, and is in the form of an elongated, forwardly extending boom overlying the base frame. This boom comprises an inner boom portion 74 having rotatably mounted in bearing sleeves 75 within the forward portion thereof, a tubular bearing member 76 of a rotatable cutter head 77. The cutter head is mounted on the inner boom portion 74 for rotation relative thereto about an axis extending longitudinally of the boom. The rotatable head is of tubular form and extends forwardly in advance of the rear boom portion and constitutes the outer portion of the boom and has pivotally mounted thereon at 78, at its outer end, on an axis extending at right angles to the head axis, a cutter support 79. The cutter support carries a hanger frame 80 on which is mounted an elongated, plane, top kerf cutter 81. The top kerf cutter 81 comprises an elongated plane cutter bar 82 of substantially less width than the cutter bar 46 and having mounted for circulation about its margin an endless cutter chain 83, the cutter bar being secured to the hanger frame 80. The top kerf cutter 81, when in its horizontal cutting position shown in Fig. 2, may be fed forward along the guideways of the horizontal frame structure so that it is arranged in superimposed relation with respect to the bottom kerf cutter 45. The means for feeding the sliding frame 67 longitudinally along its guideways relative to the horizontal frame structure 60 comprises a pair of parallel hydraulic cylinders 84, 84, arranged one at each side of the frame structure and containing reciprocable pistons 85 having their piston rods 86 extending rearwardly through the packed rear heads of the cylinders. The rear ends of the piston rods are pivotally connected at 87 on horizontal axes, to brackets 88 integral with the sliding frame 67. When fluid under pressure is supplied to one end or the other of the cylinders 84, 84, the pistons 85 may be moved to slide the sliding frame 67, together with the kerf cutter structure supported thereby, either forwardly or rearwardly relative to its guideways on the base frame. Pivotally mounted on horizontal axes at 89 on brackets 90 integral with the turntable 68, is a pair of hydraulic cylinders 91, 91 containing reciprocable pistons 92 having their piston rods 93 extending forwardly through the packed front heads of the cylinders, the forward ends of the piston rods being pivotally connected on horizontal axes at 94 to depending lugs 95 formed integral with the forward portion of the inner boom portion 74. When fluid under pressure is supplied to one end or the other of the cylinders 91, 91, the pistons 92 may be moved to swing the elongated boom structure either upwardly or downwardly about its pivot relative to the turntable. The means for rotating the cutter head 77 comprises a pair of hydraulic cylinders 96, 96 secured within lateral projections 97 formed on the opposite sides of the forward end of the inner boom portion 74. These cylinders are arranged in parallel relation at the opposite sides of the boom and contain reciprocable pistons 98 (see Fig. 10) having their piston rods 99 extending rearwardly through the rear packed heads of the cylinders. Supported at the rear ends of the piston rods 99 are brackets 100 on which are journaled guide sheaves 101. Formed on the rotatable head 77 is a cable-engaging drum 102 having wound thereon and attached thereto cables 103. These cables are secured, each at one of its ends, to the drum and the cables pass from the drum around guide sheaves 104 supported by the rear boom portion and rearwardly along the opposite sides of the boom and around the guide sheaves 101; the other ends of the cables being fixed at 105 to the projections 97. It will thus be seen that when fluid under pressure is supplied to one or the other of the cylinders 96, 96, one of the pistons 98 may be moved rearwardly to deflect one of the cables, thereby to rotate the cutter head 77 in one direction or the other about its axis. By rotating the cutter head, the kerf cutter 81 may be moved from its horizontal position shown in Fig. 2 to a vertical shear cutting position at either side of the head axis. The cutter support 79 may be swung about its pivot relative to the boom by a hydraulic cylinder 106 pivotally mounted at 107 on a bracket formed integral with the cutter head 77 and containing a reciprocable piston 108 having its piston rod 109 extending forwardly through the front packed head of the cylinder. The forward end of the piston rod is pivotally connected at 110 to a lateral arm 111 secured to the cutter support 79. When fluid under pressure is supplied to one end or the other of the cylinder 106, the piston 108 is moved relative to the cylinder to tilt the cutter support in one direction or the other about its pivotal axis 78. By swinging the boom and cutter support simultaneously in opposite directions about their respective pivotal axes, the kerf cutter 81 may be moved into horizontal cutting planes at different elevations with respect to the bottom kerf cutter 45. The top kerf cutter 81 is pivotally mounted at 112 on the cutter support 79 to swing relative thereto about an axis at right angles to the cutter support axis, and the means for swinging the kerf cutter about its pivot comprises a hydraulic cylinder 113 pivotally mounted at 114 on a bracket 115 secured to the rotatable cutter head and containing a reciprocable piston 116 having its piston rod 117 extending forwardly through the packed front head of the cylinder. The forward end of this piston rod is secured to an arm 118 pivotally connected at 119 to an arm 120 secured to the hanger frame 80. When fluid under pressure is supplied to one end or the other of the cylinder 113, the piston 116 may be moved to swing the kerf cutter 81 in one direction or the other about its pivot relative to the cutter support. When fluid is trapped within these various cylinders, the parts adjusted thereby may be locked in their adjusted positions.

Supported by the inner boom portion 74 is a hydraulic cylinder 121 (see Fig. 7) containing a reciprocable piston having its piston rod connected through suitable operating means to a plunger lock 122, engageable with notches 123 in the rotatable head 77 for locking the latter in its different positions about its axis of rotation. The boom structure supporting the top kerf cutter 81 may be swung manually with the turntable about the turntable axis to position the kerf cutter at either side of the base frame, and may be locked in its adjusted position by a locking pin 125 guided in a bore 126 formed in a bracket 127 secured to the sliding frame 67. This pin has an operating handle 128 and is urged by a coil spring 129 into locking engagement with apertures 130 formed on the turntable frame.

The driving means for the cutter chain 83 of the top kerf cutter comprises a motor 131 preferably having its casing forming the rearward portion of the boom. This motor is preferably of the reversible electric type and has its power shaft 132 extending longitudinally of the boom, and the forward end of the power shaft is connected by a coupling 133 (see Fig. 7) to a transmission shaft 134 suitably journaled within the boom and extending centrally therethrough with its axis of rotation coincident with the head axis. As shown in Fig. 8, keyed to the forward end of the shaft 134 is a bevel gear 135 meshing, as shown in Fig. 9, with a bevel gear 136, the latter in turn meshing with a bevel gear 137 keyed to a shaft 138. This shaft is journaled within the outer end of the boom and the cutter support and is arranged with its axis coincident with the cutter support pivot axis, and has secured thereto a bevel gear 139 meshing with a bevel gear 140 (see Fig. 8). The bevel gear 140 is connected by a clutch 141 to a shaft 142 suitably journaled within the cutter support and arranged with its axis coincident with the pivotal axis of the kerf cutter. Keyed to and driven by this shaft is a chain sprocket 143 which engages and drives the endless cutter chain 83. It will thus be seen that the cutter chain may be driven by the motor 131 irrespective of the adjusted position of the boom, cutter head, cutter support and cutter bar about their respective pivotal axes.

Now referring to the conveying means 2 associated with the bottom kerf cutter 45, it will be noted that the cutter bar 46, which, as aforementioned, is of rectangular shape, is formed with an open center at 145, and projecting downwardly in advance of the base and within this open center of the cutter bar is a conveyor frame 146. Guided on this conveyor frame is an endless conveyor 147 which may be of any preferred type suited for the purpose intended. The conveyor frame has a forward portion 148 (see Figs. 14 and 15) lying within the open center of the bottom kerf cutter, so that the receiving portion of the endless conveyor lies within the vertical limits of the cutter bar. The receiving portion of the conveyor is so arranged within the vertical limits of the cutter bar that as the kerf cutter is moved laterally relative to the coal face to cut a horizontal kerf therein, the receiving portion of the conveyor enters the kerf. The conveyor frame has a rearwardly inclined elevating portion 149 (Fig. 2) on which the conveyor is guided for elevating the broken down coal received by the forward receiving portion of the conveyor, and projecting rearwardly from this inclined portion is a horizontal discharge portion 150 extending rearwardly along the horizontal frame structure 60 between the side plates 61 of the latter. It will thus be evident that the loose coal received by the receiving portion of the conveyor is moved therefrom upwardly along the inclined elevating portion of the conveyor frame and then rearwardly along the top of the base frame and beneath the sliding frame 67 to discharge in an elevated position at the rear end of the apparatus. The driving means for the conveyor may assume various forms and herein comprises a motor 151 mounted beneath the rearward portion of the horizontal frame structure 60 and having keyed to its power shaft a sprocket 152 connected by an endless driven chain 153 to a sprocket 154 fixed to a conveyor drive shaft 155.

Now referring to the hydraulic fluid system and the associated control means, it will be observed in Fig. 2 that mounted on the rearward portion of the base frame 3 is a hydraulic pump 156 driven by a motor 157. This pump is arranged in a tank 158 so that the pump is submerged within the fluid within the tank. As shown in Fig. 16, the discharge side of the pump is connected by a conduit 159 leading to the supply passage of a valve box 160. The discharge passage of the valve box is connected by a conduit 161 back to the tank. Contained within the valve box are conventional rotary control valves 162, 163, 164, 165, 166 and 167, each having a manual control handle. The valve 162 controls the flow of liquid to and from the frame sliding cylinders 84, and the valve 163 controls the flow of fluid to and from the boom swinging cylinders 91. The valve 164 controls the flow of fluid from the head rotating cylinders 96, and the valve 165 controls the flow of fluid to and from the lock operating cylinder 121. The valve 166 controls the flow of fluid to and from the bar swinging cylinder 113, and the valve 167 controls the flow of fluid to and from the support tilting cylinder 106.

The general mode of operation of the improved mining apparatus is as follows: The apparatus may be transported about the mine from one working place to another in any suitable manner, as for instance on a transport truck propelled by a mine locomotive. When the working place is reached, the apparatus is dismounted from its transport truck onto the mine floor, and the feeding and controlling cables 38 and 39 are then extended from their respective cable winding drums 35 and 36 to suitable anchor jacks located at the coal face, and upon application of the high speed clutches 12 and 13 of the drum-driving gearing, the drums are rotated to wind in their respective cables at a relatively high moving speed to move the apparatus bodily over the mine floor toward the coal face. When the apparatus is located in the position shown in full lines at A in Fig. 17 with the bottom kerf cutter 45 in sumping position at the right hand rib, and the top kerf cutter 81 in its retracted position, the feeding and controlling cables 38 and 39 are extended to anchor jacks respectively located near the coal face and at the right hand rib, in the manner shown. The clutch 51, 52, 53 for the cutter chain 47 of the bottom kerf cutter 45 is then connected to effect rapid circulation of the cutter chain about the margin of the cutter bar 46, and upon application of the low speed clutches 23 and 24 of the drum-driving gearing, the cable winding drums are rotated to wind in their respective cables at a relatively low cutting speed, thereby moving the apparatus bodily over the mine floor in an endwise direction, to sump the bottom kerf cutter 45 beneath the coal, as indicated in dotted lines at B in Fig. 17. Upon completion of the sumping cut, the cable winding drums are operated to swing the apparatus laterally toward the left to move the bottom kerf cutter 45 from the position indicated at B in Fig. 17 to the position indicated at C in Fig. 18, with the apparatus located in parallelism with the rib. The operator then releases the turntable lock 125 and manually rotates the turntable 68 to swing the elongated arm structure or boom 73 laterally relative to the horizontal supporting structure 60 on the base frame, and the cutter head 77 is rotated to move the top kerf cutter 81 into its shearing position at the rib at one side of the sliding base frame. Fluid under pressure is then supplied to the cutter swinging cylinder 113 and the top kerf cutter 81 swung upwardly about its pivot into its sumping position indicated in dotted lines at D in Fig. 20, with its tip end disposed at the roof level at the coal face, and the fluid is then trapped in the swinging cylinder to lock the top kerf cutter in position. Fluid under pressure is then supplied to the feeding cylinders and the sliding frame 67 is slid forwardly along its guideways relative to the horizontal supporting structure 60, to sump the top kerf cutter 81 into the coal from the position indicated at D in Fig. 20 to the full line position indicated at E in that figure, the fluid thereafter being trapped in the feeding cylinders to hold the sliding frame in its adjusted position. Fluid under pressure is then supplied to the cutter swinging cylinder 113 and the top kerf cutter 81 is swung downwardly about its pivot relative to the arm structure from the position indicated at E in Fig. 20 to the dotted line position indicated at F in Fig. 21, to make an arcuate vertical swinging cut; the fluid thereafter being trapped in the swinging cylinder to lock the top kerf cutter in position. Fluid under pressure is then supplied to the feed cylinders 84 and the sliding frame is slid rearwardly along its guideways relative to the horizontal frame structure 60 to move the top kerf cutter 81 from the position indicated at F in Fig. 21 to the full line position indicated at G in that figure, to withdraw the kerf cutter from the coal, thereby to complete the shearing cut. When the shearing cut is completed, the cutter head 77 is rotated, to move the top kerf cutter into its horizontal top cutting position, and the arm structure 73 is swung upwardly about its pivot relative to the turntable to locate the kerf cutter in a horizontal cutting position at the roof level, as indicated in dotted lines at H in Fig. 21. Fluid under pressure is then supplied to the feed cylinders 84 and the sliding frame 67 is slid forwardly along its guideways to sump the top kerf cutter in an endwise direction into the coal at the right hand rib. When the top and bottom kerf cutters are disposed in parallel superimposed relation as shown in Fig. 19, the feed cable 38 is extended around the front guide sheave 41 at the advancing side of the apparatus and laterally to an anchor jack located at the left hand rib, in the manner shown in Fig. 19, and as the feed cable is wound in by its drum, the apparatus is fed bodily laterally across the coal face under the control of the controlling cable 39, to move the kerf cutters to cut parallel superimposed horizontal kerfs in the coal. The parallel superimposed kerfs cut in the coal form a core of coal between the kerfs, and as cutting progresses, the operator supplies fluid under pressure to the cutter support tilting cylinder 106 to tilt the top kerf cutter 81 about a transverse axis in the direction of its length, thereby to apply a breaking down pressure to the core of coal to break down fragments of the core as cutting progresses, in the manner shown in Fig. 22. At the same time, the operator may rotate the cutter head 77 back and forth about its axis to rock the top kerf cutter 81 about the cutter head axis in an edgewise direction to supplement the endwise tilting movement of the kerf cutter in the breaking down of the coal. When the apparatus approaches the left hand rib, the top kerf cutter 81 is retracted from the face by the feed cylinders 84, and the cutter head 77 is rotated to move the top kerf cutter 81 into the shearing position indicated at I in Fig. 18, at the left hand rib, and the top kerf cutter is sumped in, swung upwardly in its plane and withdrawn from the coal in the same general manner, although sumping is done at the bottom and withdrawing at the top, as the right-hand-rib shearing operation above described, to form a vertical kerf at the left hand rib. The top kerf cutter 81 is then moved into its retracted position by the feed cylinders 84, and as the feed cable 38 is wound in by the feed drum, the apparatus is swung laterally toward the left hand rib to complete the transverse cutting operation, and thereafter the bottom kerf cutter 45 is withdrawn from the coal face by extending the feeding and controlling cables 38, 39 to anchor jacks located at the rear of the apparatus and rotating the cable winding drums. If desired, at different intervals during the transverse cutting operation, the top kerf cutter 81 may be operated to insert vertical shear cuts in the coal to facilitate the breaking down operation. The top kerf cutter 81 may be located in different horizontal cutting positions with respect to the bottom kerf cutter 45 simply by swinging the arm structure 73 and the tiltable cutter support 79, so that cores of coal of different thickness may be cut in the coal seam. The broken down coal is received on the receiving portion of the conveyor 147 associated with the bottom kerf cutter and is conveyed away from the coal face into an elevated discharge position at the rear end of the apparatus and discharged into any suitable receptacle such as a mine car, or onto an entry conveyor. During any of the horizontal or shear cutting operations mentioned above, the top kerf cutter 81 may be tilted relative to the arm structure to apply a breaking down pressure to the coal to break down the coal.

As a result of this invention, it will be noted that an improved coal mining apparatus is provided having improved cutting and breaking down mechanism for completely removing the solid coal from its natural bed in a coal seam wholly without the use of explosives or other blasting means, and for loading the coal as it is removed from the coal seam. It will further be noted that by the provision of the adjustable top kerf cutter, it is possible to insert vertical shear cuts in the ribs and to cut a horizontal kerf in the coal at or below the roof level during the transverse cutting operation, and by tilting the top kerf cutter relative to the bottom kerf cutter, the coal may be readily broken down as cutting progresses. It will further be evident that by the provision of the improved conveying means associated with the bottom kerf cutter, the broken down coal is rapidly conveyed away from the coal face to a suitable point of discharge at the rear end of the apparatus. Other uses and advantages of the improved mining apparatus will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a mining and loading apparatus, in combination, a portable base, kerf cutting mechanism on said base including a horizontal bottom kerf cutter projecting from said base for cutting a horizontal plane kerf in a coal seam near the level of the mine floor, a top kerf cutter, means for mounting said top kerf cutter on said base for adjustment relative thereto into a horizontal cutting position for cutting a horizontal plane kerf in a coal seam in planes parallel with the bottom kerf and into a vertical cutting position for cutting a vertical plane kerf in planes perpendicular to said horizontal kerfs, said mounting means including adjustable supporting means for supporting said top kerf cutter for adjustment into aforesaid horizontal and vertical cutting positions, means for adjusting said top kerf cutter into aforesaid horizontal and vertical cutting positions, said mounting means also including means for supporting said top kerf cutter for pivotal and bodily longitudinal movements relative to said base, and means for operating said bottom kerf cutter to cut said horizontal bottom kerf in the coal and for operating said top kerf cutter to effect cutting of said horizontal and vertical kerfs in the coal, said means for operating said top kerf cutter including means for effecting said pivotal and bodily longitudinal movements of said top kerf cutter relative to said base.

2. In a mining and loading apparatus, in combination, a portable base, kerf cutting mechanism on said base including a horizontal bottom kerf cutter projecting from said base for cutting a horizontal plane kerf in a coal seam near the level of the mine floor, a top kerf cutter, means for mounting said top kerf cutter on said base for adjustment relative thereto into a horizontal cutting position for cutting a horizontal plane kerf in a coal seam in planes parallel with the bottom kerf and into a vertical cutting position for cutting a vertical plane kerf in planes perpendicular to said horizontal kerfs, said mounting means including adjustable supporting means for supporting said top kerf cutter for adjustment into aforesaid horizontal and vertical cutting positions, means for adjusting said top kerf cutter into aforesaid horizontal and vertical cutting positions, said mounting means also including means for supporting said top kerf cutter for pivotal and bodily longitudinal movements relative to said base, means for operating said bottom kerf cutter to cut said horizontal bottom kerf in the coal and for operating said top kerf cutter to effect cutting of said horizontal and vertical kerfs in the coal, said means for operating said top kerf cutter including means for effecting said pivotal and bodily longitudinal movements of said top kerf cutter relative to said base, said mounting means also including pivotal supporting means for pivotally supporting said top kerf cutter, when the latter is in aforesaid horizontal cutting position, for tilting movement in a vertical direction relative to said bottom kerf cutter about an axis extending transversely of said base, and means for tilting said top kerf cutter about said transverse axis.

3. In a mining and loading apparatus, in combination, a portable base, kerf cutting mechanism on said base including a horizontal bottom kerf cutter projecting from said base for cutting a horizontal plane kerf in a coal seam near the level of the mine floor, a top kerf cutter, means for mounting said top kerf cutter on said base for adjustment relative thereto into a horizontal cutting position for cutting a horizontal plane kerf in a coal seam in planes parallel with the bottom kerf and into a vertical cutting position for cutting a vertical plane kerf in planes perpendicular to said horizontal kerfs, said mounting means including adjustable supporting means for supporting said top kerf cutter for adjustment into aforesaid horizontal and vertical cutting positions, said adjustable supporting means including means for pivotally supporting said top kerf cutter for adjustment about an axis lying in a vertical plane extending longitudinally of said base, means for adjusting said top kerf cutter into aforesaid horizontal and vertical cutting positions including adjustment of said top kerf cutter about said longitudinally extending axis, said mounting means also including means for supporting said top kerf cutter for pivotal and bodily longitudinal movements relative to said base, and means for operating said bottom kerf cutter to cut said horizontal bottom kerf in the coal and for operating said top kerf cutter to effect cutting of said horizontal and vertical kerfs in the coal, said means for operating said top kerf cutter including means for effecting said pivotal and bodily longitudinal movements of said top kerf cutter relative to said base.

4. In a mining and loading apparatus, in combination, a portable base, core cutting and breaking down mechanism on said base including a horizontal bottom kerf cutter projecting forwardly from said base near the level of the mine floor for cutting a horizontal plane kerf in the coal seam at the floor level, means for moving said base bodily toward the coal face to effect endwise sumping movement of said bottom kerf cutter into the coal, a horizontal top kerf cutter for cutting a horizontal plane kerf in the coal a substantial distance above the floor level, means for mounting said top kerf cutter on said base having supporting means on which the same is supported for bodily longitudinal movement relative to said base and said bottom kerf cutter, means operative when said bottom kerf cutter is sumped within the coal for moving said mounting means bodily longitudinally relative to said base and said bottom kerf cutter to effect endwise sumping movement of said top kerf cutter into the coal, said top kerf cutter when in its sumped position overlying said bottom kerf cutter, means for moving said base bodily along the coal face when said kerf cutters are in aforesaid sumped position within the coal to effect lateral movement of said kerf cutters along the coal face to cut parallel horizontal kerfs in the coal to form a core of coal between the kerfs, said mounting means including adjustable supporting means for supporting said top kerf cutter for tilting movement in a vertical direction relative to said bottom kerf cutter, and means for tilting said top kerf cutter on said last mentioned supporting means in a vertical direction relative to said bottom kerf cutter to apply a breaking down pressure to the core of coal to break down fragments of the core as cutting progresses.

5. In a mining and loading apparatus, in combination, a portable base, kerf cutting mechanism on said base including a horizontal bottom kerf cutter projecting forwardly from said base near the level of the mine floor for cutting a horizontal plane kerf in the coal seam at the floor level, a top kerf cutter, means for mounting said top kerf cutter on said base for longitudinal movement back and forth therealong toward and from the coal face, said mounting means including adjustable supporting means for supporting said top kerf cutter for adjustment relative to said base into either horizontal or vertical cutting positions relative to said bottom kerf cutter, means for adjusting said top kerf cutter on its mounting means into aforesaid horizontal and vertical cutting positions relative to said bottom kerf cutter, means for moving said mounting means longitudinally along said base toward the coal face to effect sumping of said top kerf cutter in an endwise direction into the coal in either horizontal or vertical cutting positions of said top kerf cutter, said top kerf cutter when in its sumped position within the coal and when in its horizontal cutting position overlying said bottom kerf cutter, and means for operating said bottom kerf cutter to cut a horizontal kerf in the coal and for operating said top kerf cutter to cut either horizontal or vertical kerfs in the coal.

6. In a mining and loading apparatus, in combination, a portable base, kerf cutting mechanism on said base including a horizontal bottom plane kerf cutter projecting from said base near the level of the mine floor for cutting a horizontal plane kerf in a coal seam at the floor level, a vertical plane kerf cutter pivoted to swing in vertical planes to cut a vertical plane kerf in the coal between the mine roof and mine floor in planes perpendicular to said horizontal kerf, adjustable supporting means mounted on said base for supporting said vertical kerf cutter, while the latter is outside the coal face, for adjustment horizontally relative to said base and said horizontal kerf cutter when said horizontal kerf cutter is relatively stationary in a position within the coal, from one side of said base to the other into vertical cutting positions at either side of said base, means for swinging said vertical plane kerf cutter in vertical planes about its pivot in either adjusted position thereof relative to said base and said bottom kerf cutter, and means for operating said horizontal kerf cutter to effect the cutting of a horizontal bottom kerf and for operating said vertical kerf cutter to effect cutting of a vertical kerf in either adjusted position of said vertical kerf cutter.

7. In a mining and loading apparatus, in combination, a portable base, kerf cutting mechanism on said base including a horizontal bottom kerf cutter projecting from said base near the level of the mine floor for cutting a horizontal plane kerf in the coal seam at the level of the mine floor, a vertical kerf cutter for cutting a vertical kerf in the coal between the mine roof and mine floor in planes perpendicular to said horizontal kerf, adjustable supporting means mounted on said base for supporting said vertical kerf cutter for adjustment horizontally relative to said base and said bottom kerf cutter, while the latter remains relatively stationary, from one side of said base to the other into vertical cutting positions at either side of said base and parallel to the ribs, said supporting means including means for pivotally supporting said vertical kerf cutter for swinging movement in a vertical direction relative to said bottom kerf cutter, and means for operating said horizontal kerf cutter to effect the cutting of a horizontal bottom kerf in the coal and for operating said vertical kerf cutter to effect the cutting of a vertical kerf in the coal in either adjusted position of said vertical kerf cutter relative to said base and bottom kerf cutter, said operating means for said vertical kerf cutter including means for swinging said vertical kerf cutter in a vertical direction on its pivotal supporting means.

8. In a mining and loading apparatus, in combination, a portable base, kerf cutting mechanism on said base including a horizontal bottom kerf cutter projecting from said base near the level of the mine floor for cutting a horizontal plane kerf in the coal seam at the level of the mine floor, a vertical kerf cutter for cutting a vertical kerf in the coal between the mine roof and mine floor in planes perpendicular to said horizontal kerf, adjustable supporting means mounted on said base for supporting said vertical kerf cutter for adjustment horizontally relative to said base from one side of said base to the other into vertical cutting positions at either side of said base, said supporting means including means for pivotally supporting said vertical kerf cutter for swinging movement in a vertical direction relative to said base and bottom kerf cutter and for horizontal swinging movement laterally relative to said base and bottom kerf cutter, means for swinging said supporting means horizontally relative to said base to move said vertical kerf cutter into vertical cutting positions at either side of said base as aforesaid, means for operating said horizontal kerf cutter to effect the cutting of a horizontal bottom kerf in the coal and for operating said vertical kerf cutter to effect the cutting of a vertical kerf in the coal in either adjusted position of said vertical kerf cutter, said operating means for said vertical kerf cutter including means for swinging said vertical kerf cutter in a vertical direction on its pivotal supporting means.

9. In a mining and loading apparatus, in combination, a portable base, kerf cutting mechanism on said base including a horizontal bottom kerf cutter projecting horizontally from said base midway between the sides of the latter near the level of the mine floor for cutting a horizontal plane kerf in the coal seam at the floor level, means for moving said base bodily toward the coal face to effect endwise sumping movement of said bottom kerf cutter into the coal, a vertical kerf cutter for cutting a vertical kerf in the coal between the mine roof and mine floor in planes perpendicular to said horizontal kerf, adjustable supporting means mounted on said base for supporting said vertical kerf cutter for adjustment horizontally relative to said base from one side of said base to the other into vertical cutting positions at either side of said base and at either side of said horizontal kerf cutter, said supporting means including means for supporting said vertical kerf cutter for bodily longitudinal movements back and forth relative to said base and for swinging movement in a vertical direction relative to said base and bottom kerf cutter, means for moving said supporting means bodily longitudinally back and forth relative to said base toward and from the coal face to effect forward sumping movement and rearward withdrawal movement of said kerf cutter with respect to the coal face, means for swinging said vertical kerf cutter in a vertical direction on its pivotal supporting means to effect vertical swinging movement of said kerf cutter intermediate said sumping and withdrawal movements thereof, and means for operating said horizontal kerf cutter to effect the cutting of a horizontal bottom kerf in the coal when said vertical kerf cutter is in its rearward retracted position relative to said base.

10. In a mining and loading apparatus, in combination, a portable base, kerf cutting mechanism on said base including a horizontal bottom kerf cutter projecting horizontally from said base near the level of the mine floor for cutting a horizontal plane kerb in a coal seam near the floor level, a vertical kerf cutter for cutting a vertical plane kerf in the coal between the mine roof and mine floor in planes perpendicular to said horizontal kerf, adjustable supporting means mounted on said base for supporting said vertical kerf cutter for bodily longitudinal movements back and forth relative to said base and for vertical swinging movement relative to said base and bottom kerf cutter, said supporting means including means for supporting said vertical kerf cutter for adjustment horizontally relative to said base, means for adjusting said supporting means horizontally relative to said base to move said vertical kerf cutter into vertical cutting positions at either side of said base, and means for moving said vertical kerf cutter, in any vertical cutting position thereof in which it lies in vertical planes parallel to its path of bodily longitudinal movements back and forth relative to said base, to effect vertical sumping, swinging and withdrawal movements of said vertical kerf cutter to cut a vertical plane kerf in the coal.

11. In a mining and loading apparatus, in combination, a portable base, core cutting and breaking down mechanism on said base including a horizontal bottom kerf cutter for cutting a horizontal plane kerf in the coal seam at the level of the mine floor, a horizontal top kerf cutter for cutting a horizontal plane kerf in the coal a substantial distance above the mine floor, means for mounting said kerf cutters on said base including adjustable supporting means for said top kerf cutter for supporting the latter for adjustment into parallel cutting planes at different elevations relative to said bottom kerf cutter, said supporting means including pivotal supporting means for said top kerf cutter vertically adjustable with respect to said bottom kerf cutter for supporting said top kerf cutter for tilting movement in a vertical direction relative to said bottom kerf cutter irrespective of the elevated position of said top kerf cutter, means operative when said top kerf cutter is in any of aforesaid parallel cutting planes above said bottom kerf cutter for moving said kerf cutters in an endwise direction toward the coal face to effect sumping of said kerf cutters into the coal, means for moving said kerf cutters in unison rectilinearly laterally along the coal face to cut simultaneously parallel horizontal kerfs in the coal to form a core of coal between the kerfs, means for adjusting said top kerf cutter on its supporting means in parallel cutting planes at different elevations as aforesaid to vary the height of the core of coal between the kerfs, and means for tilting said top kerf cutter on its pivotal supporting means in a vertical direction relative to said bottom kerf cutter to apply a breaking down pressure to the core of coal to break down fragments of the core as cutting progresses.

12. In a mining and loading apparatus, in combination, a portable base, kerf cutting mechanism on said base including a horizontal bottom kerf cutter for cutting a horizontal plane kerf in the coal face at the level of the mine floor, a vertical kerf cutter for cutting a vertical kerf in the coal in planes perpendicular to said horizontal kerf, means for mounting said vertical kerf cutter on said base including adjustable supporting means for supporting said vertical kerf cutter for adjustment horizontally relative to said base into parallel vertical cutting planes, said mounting means including means for supporting said vertical kerf cutter for movements bodily longitudinally back and forth relative to said base and for swinging movement in a vertical direction relative to said base, means for adjusting said supporting means horizontally relative to said base to move said vertical kerf cutter into parallel vertical cutting planes as aforesaid, means for moving said vertical kerf cutter forwardly longitudinally relative to said base to sump said cutter into the coal and for moving said vertical kerf cutter rearwardly relative to said base to withdraw said kerf cutter from the coal, means for swinging said kerf cutter on its supporting means in a vertical direction relative to said base to form a vertical shear cut intermediate said sumping and withdrawal movements of said vertical kerf cutter, and means operative when said vertical kerf cutter is in its retracted position on the base for moving said bottom kerf cutter in an endwise direction toward the coal face to effect sumping thereof into the coal and for thereafter moving said bottom kerf cutter in a lateral direction along the coal face to cut a horizontal plane kerf in the coal.

13. In a mining and loading apparatus, in combination, a portable base, core cutting and breaking down mechanism on said base including a horizontal bottom kerf cutter projecting forwardly in an endwise direction from the front end of said base for cutting a horizontal plane kerf in a coal seam at the level of the mine floor, a horizontal top kerf cutter extending longitudinally in parallelism with and above said bottom kerf cutter, means for mounting said top kerf cutter on said base including adjustable supporting means for supporting said top cutter for adjustment in a vertical direction relative to said bottom cutter, means operative irrespective of the vertically adjusted position of said top kerf cutter relative to said bottom kerf cutter for moving said kerf cutters forwardly in an endwise direction toward the coal face to effect sumping thereof into the coal, means for feeding said base, while the same is disposed endwise to the coal face, bodily laterally along the coal face to move said kerf cutters rectilinearly laterally relative to the coal face to cut parallel horizontal kerfs in the coal to form a core of coal between the kerfs, and means for adjusting said top kerf cutter on its supporting means in a vertical direction relative to said bottom cutter to apply at certain intervals during movement of said base along the coal face a breaking down pressure to the core of coal to break down fragments of the core as cutting progresses.

14. In a mining and loading apparatus, in combination, a portable base, core cutting and breaking down mechanism on said base including a horizontal bottom kerf cutter projecting forwardly in an endwise direction from the front end of said base for cutting a horizontal plane kerf in a coal seam at the level of the mine floor, a horizontal top kerf cutter extending longitudinally in parallelism with and above said bottom kerf cutter, means for mounting said top kerf cutter on said base including adjustable supporting means for supporting said top kerf cutter for adjustment into different parallel horizontal cutting positions at different elevations with respect to said bottom kerf cutter, said adjustable supporting means including means vertically adjustable relative to said bottom kerf cutter for supporting said top kerf cutter for tilting movement relative to said bottom kerf cutter, means operative irrespective of the vertically adjusted position of said top kerf cutter relative to said bottom kerf cutter for moving said kerf cutters forwardly in an endwise direction toward the coal face to effect sumping thereof into the coal, means for feeding said base bodily laterally along the coal face to move said kerf cutters rectilinearly laterally relative to the coal face to cut parallel horizontal kerfs in the coal to form a core of coal between the kerfs, means for adjusting said top kerf cutter on its supporting means into different parallel horizontal cutting positions as aforesaid to vary the height of the core between the kerfs, and means bodily vertically adjustable relative to said bottom kerf cutter for tilting said top kerf cutter on its supporting means as aforesaid to apply at certain intervals during movement of the base along the coal face a breaking down pressure to the core of coal to break down fragments of the core as cutting progresses.

JOSEPH F. JOY.